W. CLOUSER.
CORN HARVESTER AND HUSKER.
APPLICATION FILED JAN. 4, 1908.

1,014,812.

Patented Jan. 16, 1912.
6 SHEETS—SHEET 1.

W. CLOUSER.
CORN HARVESTER AND HUSKER.
APPLICATION FILED JAN. 4, 1908.

1,014,812.

Patented Jan. 16, 1912.

6 SHEETS—SHEET 2.

Witnesses

Inventor
W. Clouser
By
Attorneys

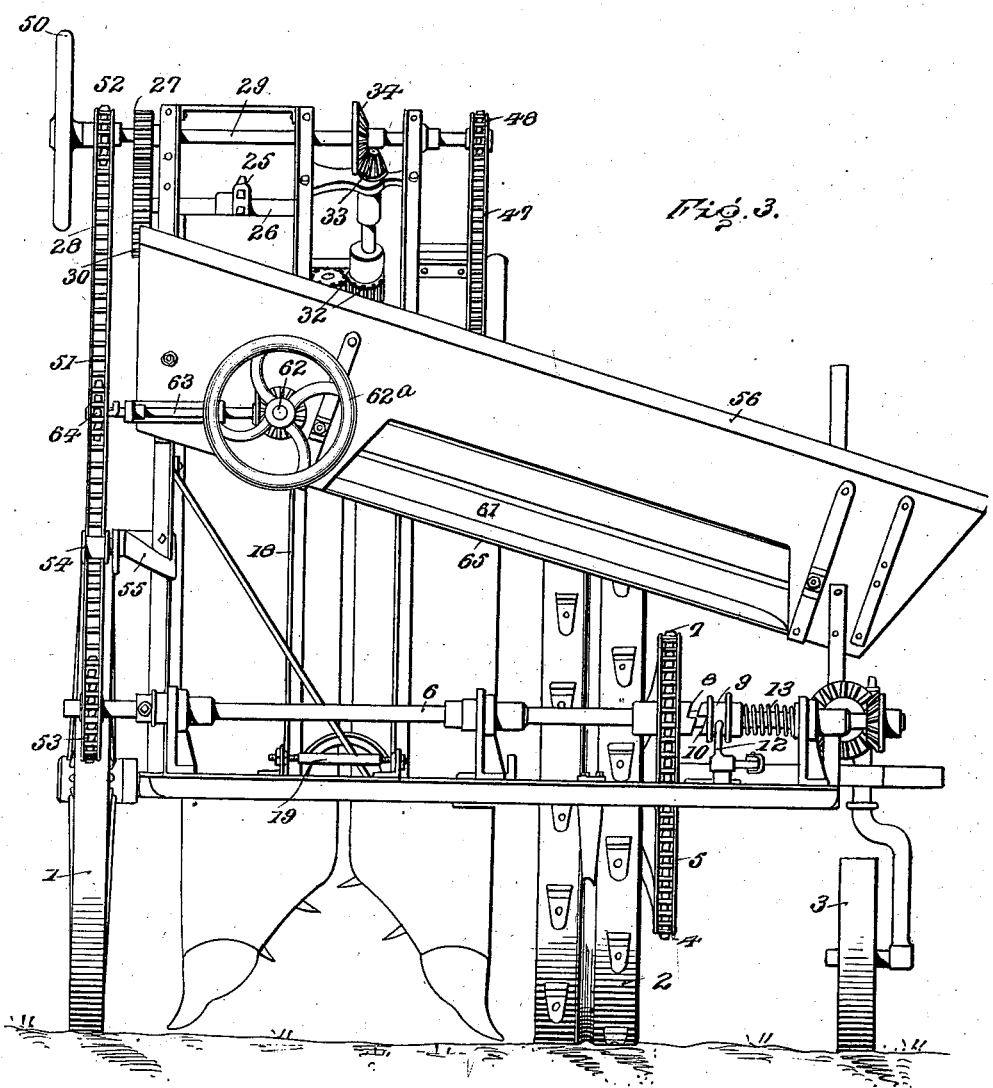

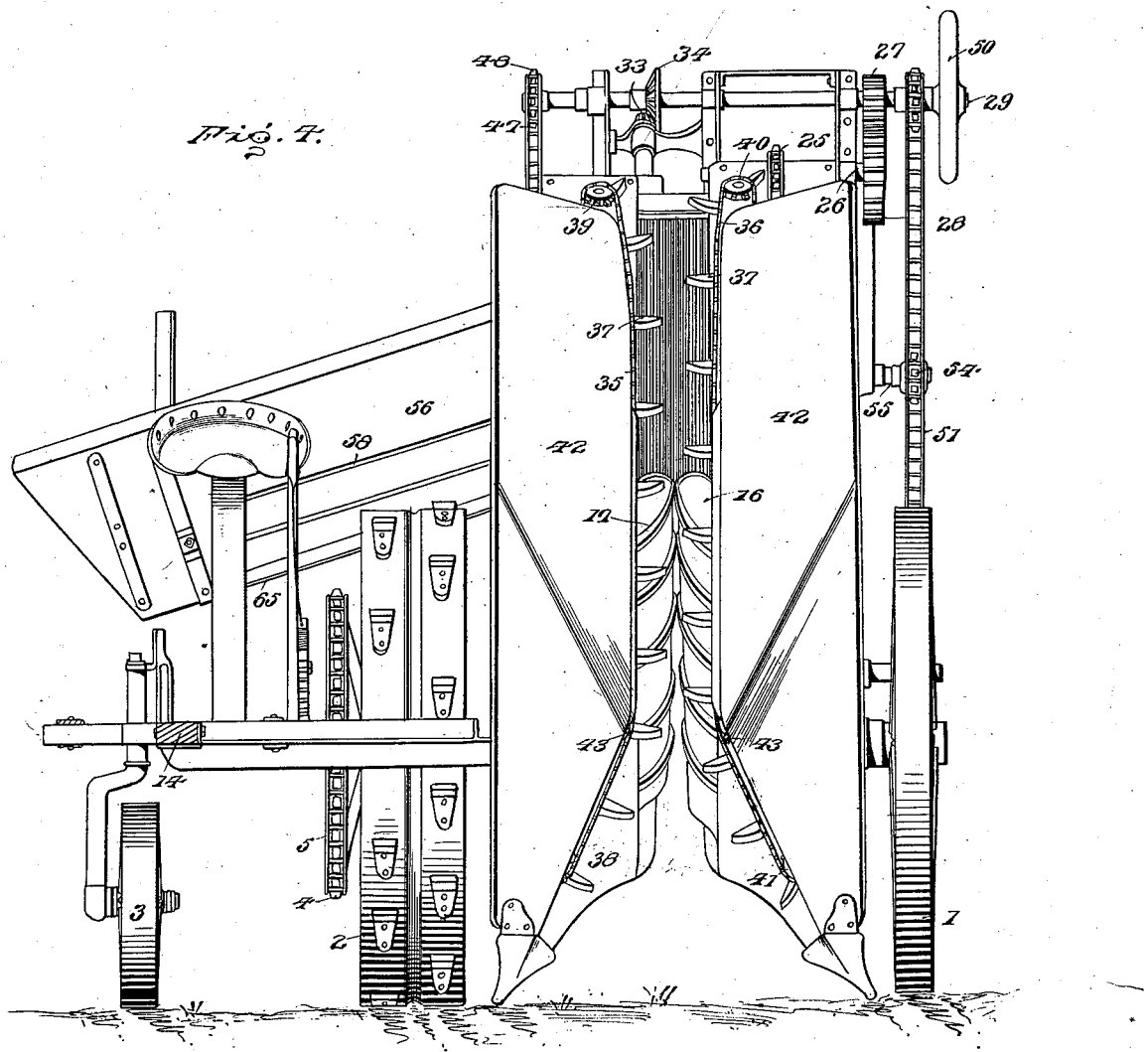

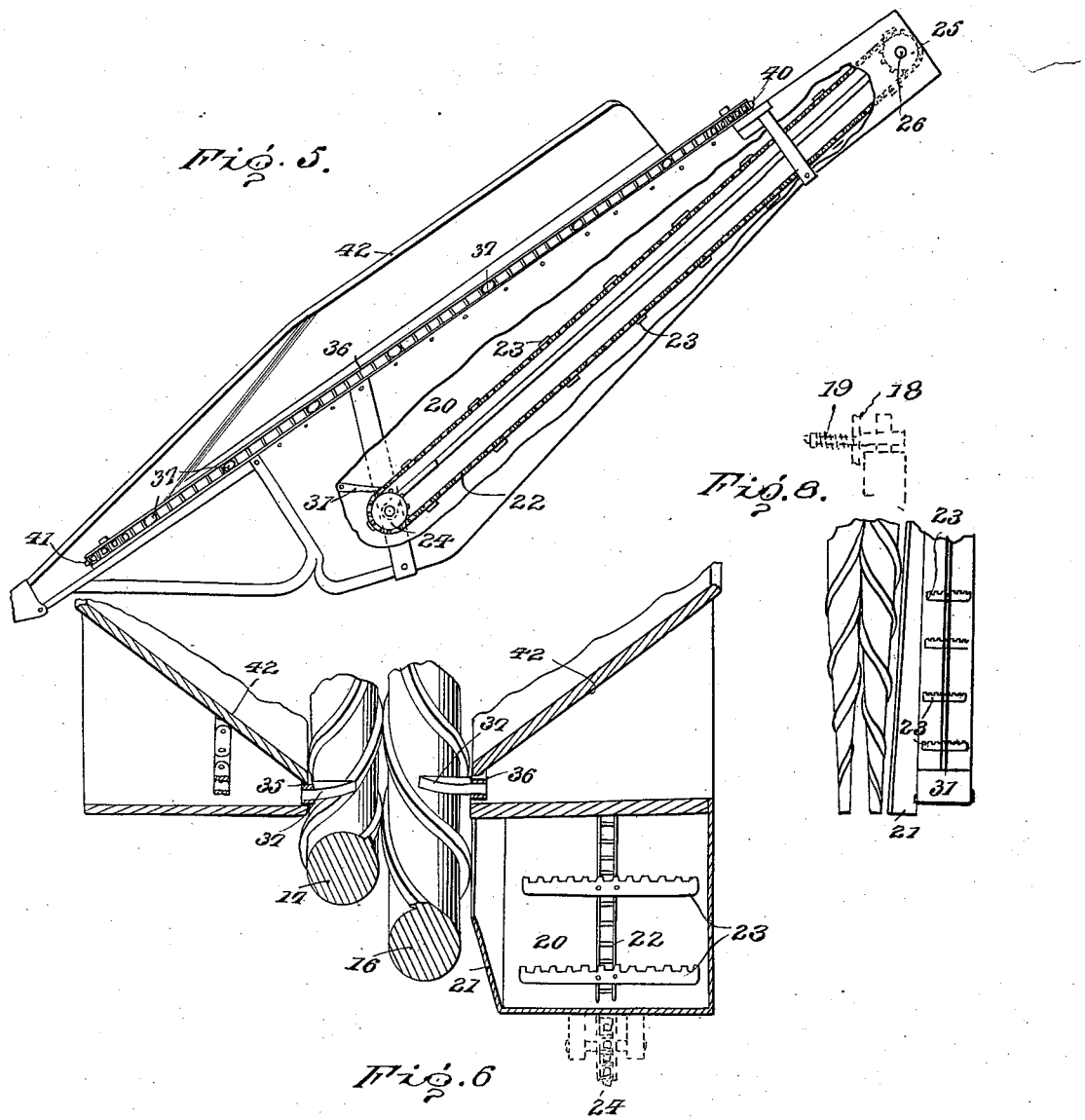

W. CLOUSER.
CORN HARVESTER AND HUSKER.
APPLICATION FILED JAN. 4, 1908.
1,014,812.
Patented Jan. 16, 1912.
6 SHEETS—SHEET 6.
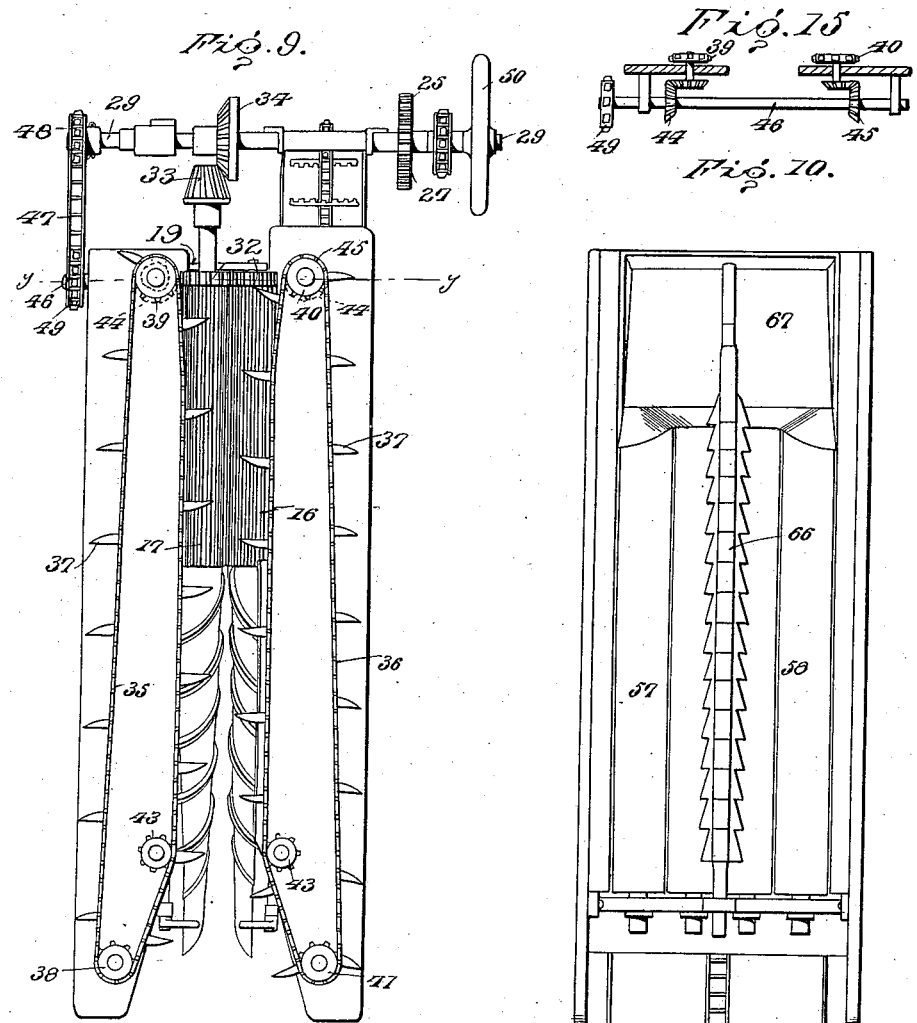
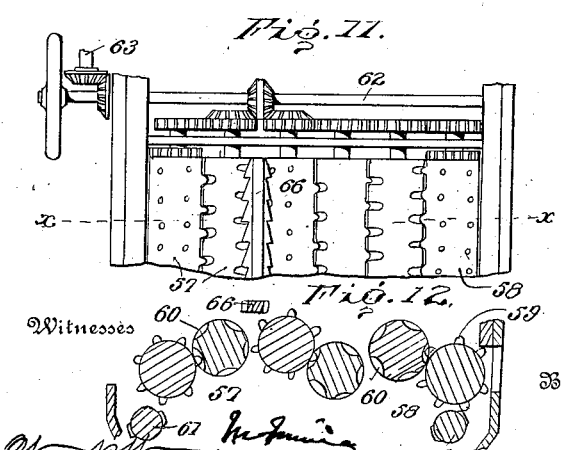
Inventor
W. Clouser
Witnesses
By
R.H.A.B. Lacey, Attorneys

UNITED STATES PATENT OFFICE.

WILLIAM CLOUSER, OF DANA, INDIANA.

CORN HARVESTER AND HUSKER.

1,014,812.     Specification of Letters Patent.     Patented Jan. 16, 1912.

Application filed January 4, 1908. Serial No. 409,322.

*To all whom it may concern:*

Be it known that I, WILLIAM CLOUSER, citizen of the United States, residing at Dana, in the county of Vermilion and State of Indiana, have invented certain new and useful Improvements in Corn Harvesters and Huskers, of which the following is a specification.

The present invention appertains to agricultural machinery and more particularly to harvesters for snapping ears of corn from the stalks in the field and husking the ears and delivering the same into a wagon or other receiver driven alongside the harvester.

While the machine is designed most especially for those engaged in raising Indian corn, it may be advantageously employed in harvesting ears of corn of any nature.

The machine is intended to be drawn over the field by a team of horses, nevertheless, it may be propelled in any manner and operates upon one row of corn at a time, snapping the ears from the stalks, husking the ears and loading the husked ears into a receptacle.

For a full understanding of the invention and the merits thereof and also to acquire a knowledge of the details of construction and the means for effecting the result, reference is to be had to the following description and accompanying drawings.

Figure 1:
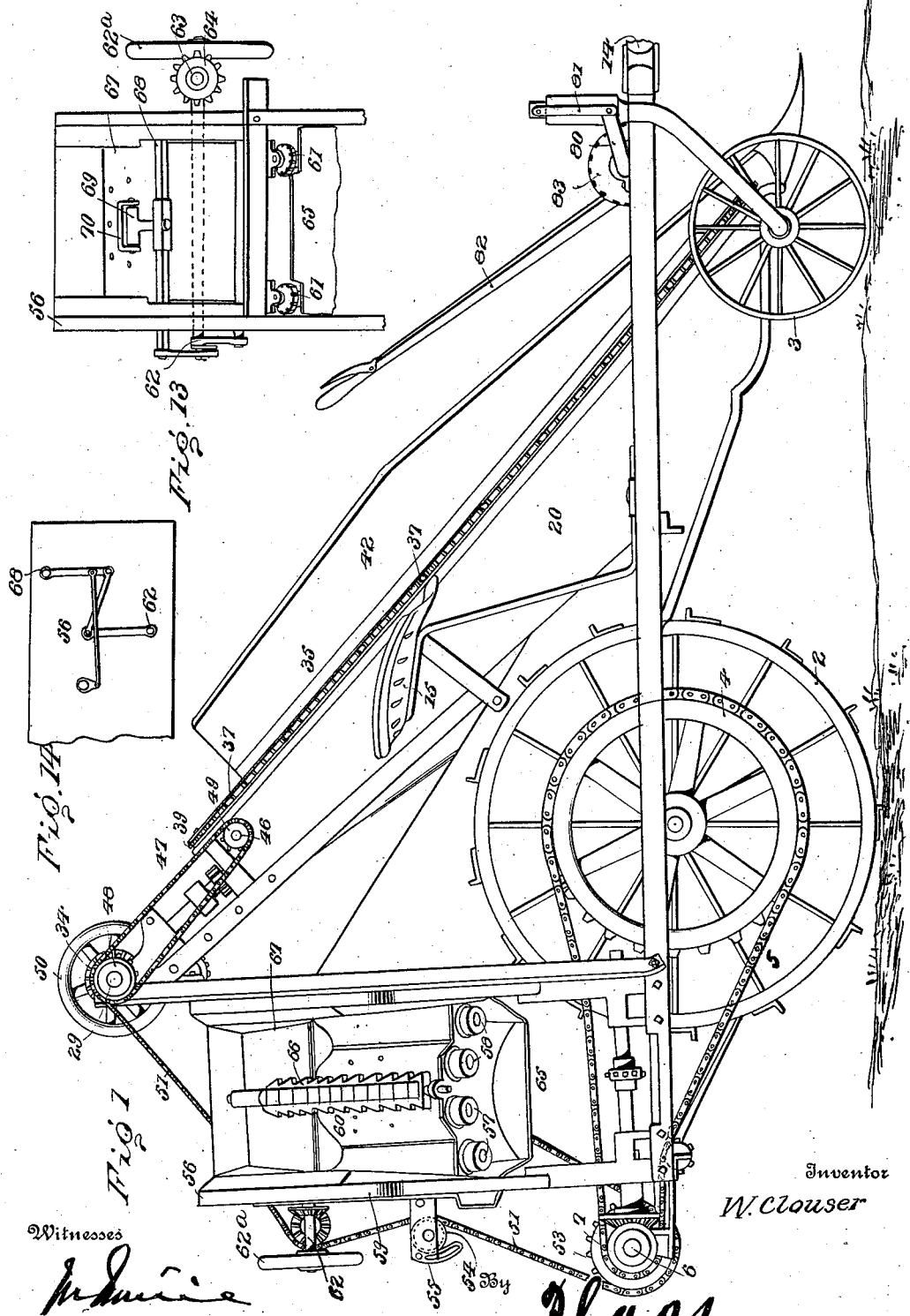
Figure 2:
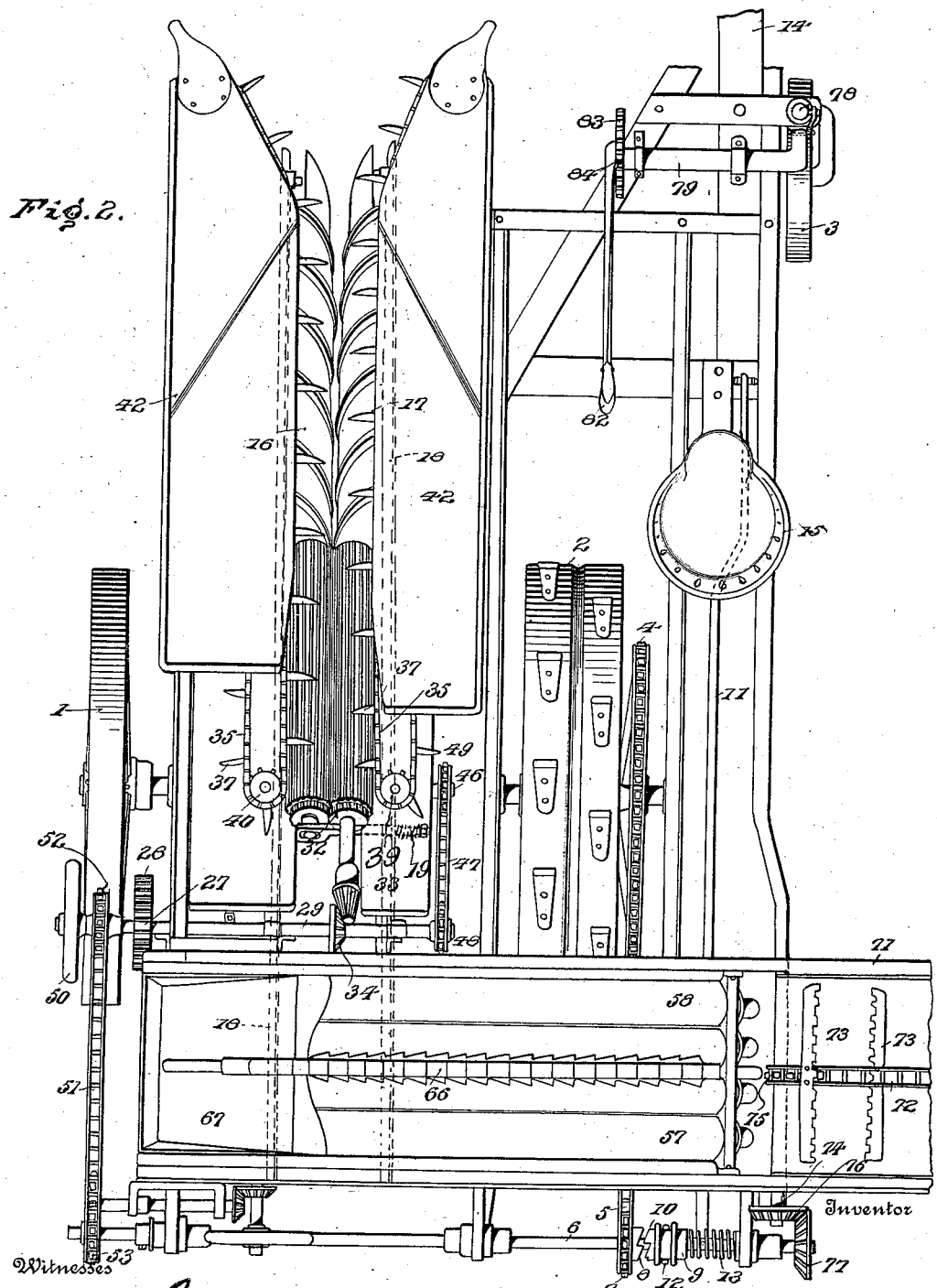

While the invention may be adapted to different forms and conditions by changes in the structure and minor details without departing from the spirit or essential features thereof, still the preferred embodiment is shown in the accompanying drawings, in which:

Figure 1 is a side view of a corn harvester and husker embodying the invention, the elevator for loading the ears into a wagon or other receptacle being omitted. Fig. 2 is a top plan view of the machine, the upper outer portion of the elevator being broken away. Fig. 3 is a rear view of the machine, the elevator being detached. Fig. 4 is a front view of the machine omitting the elevator. Fig. 5 is a side view of the framework supporting the snapping rolls, showing the relation of the elevator for delivering the snapped ears to the husking rolls. Fig. 6 is a transverse section of the framework and adjunctive parts of the snapping mechanism. Fig. 7 is a sectional view of the upper or fluted portions of the snapping rolls, showing their relative position. Fig. 8 is a detail view of the lower or tapered ends of the snapping rolls, showing the portion of the elevator by means of which the snapped ears are delivered to the husking rolls. Fig. 9 is a top plan view of the snapping rolls, feed chains coöperating therewith, the actuating mechanism and the mountings for the parts. Fig. 10 is a top plan view of the husking mechanism and a portion of the elevator for loading the snapped and husked ears into the wagon or receptacle. Fig. 11 is a detail view of a modification, showing three pairs of husking rolls. Fig. 12 is a transverse section on the line $x$—$x$ of Fig. 11. Fig. 13 is a rear view of the husking mechanism showing the means for imparting a vibratory movement to the pan and feeder. Fig. 14 is a detail view in elevation of the means for transmitting a gigging motion to the pan and feeder. Fig. 15 is a transverse section on the line $y$—$y$ of Fig. 9. Fig. 16 is a transverse section of a modification showing three pairs of husking rolls.

Corresponding and like parts are referred to in the following description and indicated in all the views of the drawings by the same reference characters.

The machine is mounted upon wheels 1, 2 and 3, the latter being a caster-wheel and vertically adjustable to admit of the front end of the snapping mechanism being adjusted to a greater or less distance from the surface of the ground so as to pick up fallen stalks. The caster-wheel 3 is set in advance of the wheels 1 and 2, the latter alining transversely. The wheel 1 serves simply as a rolling support, whereas the wheel 2 performs the double function of a rolling support and a driver for operating the working parts of the machine, such as the snapping rolls, the endless feeders coöperating therewith, the husking rolls and the elevator for loading the ears of corn into the wagon or receptacle. The drive wheel 2 is made broad and its tread is studded with projections to make positive engagement with the ground and prevent slipping. A spur wheel 4 is connected with the drive wheel 2 so as to rotate therewith and motion is taken therefrom by means of a sprocket chain 5 for driving a countershaft 6 located in the rear of the machine and extending transversely thereof. A sprocket wheel 7, loose upon the countershaft 6, receives the rear portion of the sprocket chain 5 and is provided upon one side with a half clutch 8. A sleeve 9 mounted upon the countershaft 6 to turn therewith and movable toward and from the spur wheel 7, is provided with a half clutch 10 to coöperate with the half clutch 8. When the clutch members 8 and 10 are in mesh and the machine is traveling over the field, motion is imparted to the countershaft 6, but when the clutch members 8 and 10 are separated, the countershaft 6 and the working parts of the machine are at rest, whether the machine is either moving or at a standstill. The sleeve 9 is adapted to be operated from the driver's seat by suitable connections, such as lever 11 and fork 12, the latter having its forked members fitted into an annular groove of the sleeve 9. A spring 13, mounted upon the shaft 6, normally exerts a pressure upon said sleeve to hold the clutch members 8 and 10 in meshing relation. The framework of the machine may be of any design or construction depending upon the size and relative arrangement of the coöperating parts and comprises a series of longitudinal bars or timbers and a plurality of transverse bars or timbers. The pole or tongue 14 is located at one side of the machine, and the caster wheel 3 is arranged exterior thereto or upon the outer side so as to overcome side draft, as much as possible. The snapping mechanism extends lengthwise of the machine and inclines upwardly and rearwardly. The husking mechanism is located in the rear of the machine and transversely thereof and inclines slightly to the horizontal to insure a positive feed of the ears throughout the length thereof and from the snapping mechanism toward the elevator by means of which the husked ears are loaded into the wagon. The driver's seat 15 is conveniently located so as to balance the machine and to admit of the working parts being readily observed and under control.

The snapping rolls 16 and 17 are of like formation and are mounted in bearings to admit both of a lateral adjustment and a yielding movement to adapt them to the size of the stalks. The front portions of the rolls are tapered with the result that a flared space is provided for the entrance of the stalks between them. The rear portions of the rolls are of uniform diameter and longitudinally fluted or corrugated to insure the snapping or breaking of the ears from the stalks. The tapered portions of the snapping rolls are provided with spiral ribs or flights which serve to advance or feed the stalks between the rolls as the machine advances. The snapping rolls are mounted in yieldable bearings and the supports for said bearings are laterally adjustable to admit of varying the space between the snapping rolls in their normal position. Longitudinal bars 18 support yieldable bearings for the snapping rolls and are adjustable laterally by means of a set rod or bar 19 having its end portions threaded and passed through openings in the rear ends of the bars 18. The snapping roll 17 is arranged in a higher plane than the snapping roll 16, hence the ears of corn, when detached from the stalks, pass over the snapping rolls 16 and are received in a trough 20 at one side thereof and over which the upper run of an elevator travels upward and rearward to effect delivery of said ears to the husking mechanism. The wall 21 of the trough 20 adjacent to the snapping roll 16, inclines toward said snapping roll at its upper edge and terminates as close to said snapping roll as possible to insure delivery of the ears into the trough. The elevator consists of an endless chain 22 and toothed bars 23, the latter being attached at a middle point to the endless chain arranged to sweep over the bottom of the trough so as to catch the ears and move the same upward and rearward. The elevator chain 22 is supported at its ends by means of sprocket wheels 24 and 25, the latter being fast to a transverse shaft 26 to which motion is imparted by means of an intermeshing gearing 27 and 28, the latter being fast to the shaft 26 and the former fast to a shaft 29. The bottom of the trough 20 is provided near its lower end with a door 31, through which the elevator operates, said door opening to admit of the passage of the toothed bars to prevent any ears dropping through the opening. The ears, as they clear the upper end of the trough 20, drop into the husking mechanism. The snapping rolls 16 and 17 are geared at their upper ends so that they revolve toward each other from above, thereby tending to draw the stalks downward and to effect a breaking of the ears therefrom. A spur 32 is secured to each snapping roll and the teeth thereof are of such a length as to prevent separation either in the lateral adjustment or yielding movement of said snapping rolls. The shaft of one of the snapping rolls, as 17, is extended at its upper end and provided with a bevel pinion 33, which meshes with a bevel gear wheel 34 fast to the shaft 29. By this means motion is transmitted from said shaft to the snapping rolls.

Feed chains 35 and 36 coöperate with the snapping rolls to advance the stalks between them. The feed chains are located above the snapping rolls and are driven so that their inner or opposing portions travel upward and rearward in the same direction. The feed chains are provided at intervals in their length with teeth 37 which make positive engagement with the stalks so as to insure their upward and rearward movement between the snapping rolls. The feed chains are located in the same plane, which is slightly above the snapping rolls 17 and parallel therewith. This arrangement brings the feed chain 36 a distance above the snapping rolls 16 sufficiently far to insure unobstructed passage of the ears of corn to the trough 20 when detached from the stalks. The feed chain 35 is supported at its ends by means of sprocket wheels 38 and 39. The feed chain 36 is supported at its ends by means of sprocket wheels 40 and 41. Guide boards 42 extend over the feed chains 35 and 36 and flare upwardly and outwardly from their inner edges, which latter terminate about in line with the outer sides of the snapping rolls. The guide boards 42 flare at their inner lower ends to form a throat to receive the stalks and direct the same into the space formed between the snapping rolls. The inner portions of the runs of the feed chains approach close to the inner edges of the guide boards 42 so as to leave the teeth 37 projecting beyond said edges to make positive engagement with the stalks. The lower portions of the feed chains follow the flare or inclination of the lower front ends of the guide boards, this being effected by means of idlers 43, the same consisting of sprocket wheels located at the angles formed between the longitudinal and inclined edges of the respective guide boards. The upper sprocket wheels 39 and 40 are positively driven by means of bevel gearing 44 and 45 between them and a transverse shaft 46, which is connected with the shaft 29 by means of a sprocket chain 47 and sprocket wheels 48 and 49. The transverse shafts 46 and 29 are parallel and the latter is provided with a balance wheel 50 and is driven from the countershaft 6 by means of sprocket chain 51 which passes around a sprocket wheel 52 fast to the shaft 29 and the sprocket wheel 53 fast to the countershaft 6. The tension upon the sprocket chain 51 is maintained by means of a tightener 54 consisting of a flanged roller adjustably mounted upon a bracket 55.

The husking mechanism is located in the rear of the snapping mechanism and comprises a suitable framework 56 and pairs of husking rolls 57 and 58, the rolls of each pair being driven so that their upper portions travel inward and downward so as to strip the husks from the ears and cause said husks to pass between the coöperating rolls. It is to be understood that there may be as many pairs of husking rolls as desired, two pairs being shown in Fig. 1 and the detail views thereof, and three pairs being illustrated in Figs. 11 and 12. The pairs of husking rolls are spaced apart slightly and the inner or opposing rolls are in a higher plane than the outer husking rolls, thereby tending to direct the ears of corn outward. The outer or lower husking rolls are provided with teeth 59 and the inner or higher rolls have corresponding recesses 60 to receive said teeth. The teeth 59 penetrate the husks of the ears and make positive engagement therewith so as to insure stripping or tearing of the husks from the ears. The husks, as they are stripped or torn from the ears, pass downward between the pairs of husking rolls and tend to cling to the toothed husking rolls and are removed therefrom by means of stripper rolls 61 arranged directly below the outer husking rolls. The rolls of each pair are geared at their upper ends and receive motion from a transverse shaft 62 provided with a balance wheel $62^a$ and geared to a shaft 63 provided at its outer end with a sprocket wheel 64 engaged by the sprocket chain 51 from which it derives motion. The clearer rolls 61 are geared at their upper ends to the outer rolls of the respective pairs. A pan 65 is located below the husking and clearer rolls to catch loose grains that may be detached from the cob so as to direct them to the elevator to be loaded into the wagon with the ears. A feeder 66 is located above the inner or higher rolls of the pairs and is ribbed at its top and opposite sides, said ribs being notched to provide teeth, the lower sides of which are abrupt and the upper sides rearwardly inclined. The feeder 66 receives a longitudinally reciprocating movement so as to advance the ears along the husking rolls. Any suitable mechanism may be employed for imparting a reciprocating movement to the feeder 66. A pan 67 is arranged over the upper ends of the husking rolls and directly below the delivery end of the elevator of the snapping mechanism so as to receive the ears delivered or dropped therefrom. The pan 67 receives a reciprocating movement lengthwise of the husking rolls and has the feeder 66 connected thereto so as to reciprocate therewith. A rock shaft 68 is connected with the pan 67 by means of an arm 69 fast to the rock shaft and a bracket 70 fast to the bottom side of the pan. The rock shaft 68 is adapted to have an oscillatory movement imparted thereto from a convenient portion of the operating mechanism by means of suitable connections, preferably in the form of one or more crank arms operatively connected with the crank shaft as best shown in Fig. 14 of the drawing.

The elevator for loading the ears of corn after being husked, into the wagon or other receptacle, consists of a trough or like frame 71 and an endless chain 72 provided with toothed cross arms 73 arranged to sweep over the bottom of the trough. The endless chain 72 receives motion from a longitudinal shaft 74 upon which is mounted a sprocket wheel 75. A bevel gear 76 at the rear end of the shaft 75 meshes with a companion bevel gear 77 fast to the outer end of the countershaft 6. The elevator may be of any length and is adapted to be inclined to suit the height of the wagon or receptacle into which the ears of corn are to be loaded.

The front end of the machine is adapted to be raised and lowered to adjust the front end of the snapping mechanism to a greater or less height from the corn. This is accomplished by means of the caster-wheel 3 whose stem 78 is mounted in a vertical bearing in which it is both adjustable vertically and free to turn to admit of the caster-wheel readily adapting itself to any change when departing from a direct course. A shaft 79, journaled in bearings at or near the front end of the framework, is provided with a crank arm 80 which is connected by means of a link 81 with the stem 78, an operating lever 82 being fast to said shaft 79 and extending within convenient reach of the driver's seat 15 to be operated when it is required to raise or lower the front end of the machine. A toothed segment 83 coöperates with a latch bolt 84 carried by the lever 82 so as to hold the same in the required adjusted position, thereby holding the framework when adjusted.

When the machine is in operation, it is advanced over the field, being so positioned and directed as to cause a row of stalks to pass between the flared ends of the guide boards 42 and between the snapping rolls 16 and 17, which latter break or snap the ears from the stalks, the latter passing between the rolls and the ears dropping into the trough 20 and carried upward therein by means of the elevator 22—23 and delivered to the husking mechanism, which latter strips or tears the husks therefrom. As the ears of corn are divested of the husks, they pass downward through the husking mechanism to the elevator and are loaded thereby into the wagon driven alongside of the machine or into a suitable receptacle conveniently provided and movable with the machine. The stalks are left standing and the husks stripped from the ears are discharged laterally from the machine and drop upon the ground.

Having thus described the invention, what is claimed as new is:

In a corn harvester including coöperating snapping rolls one located at a higher elevation than the other and both arranged longitudinally of the machine, coöperating husking rolls arranged transversely of the machine, and a conveyer operating between the two sets of rolls adjacent the lowermost snapping roll and arranged to receive ears of corn from the lowermost snapping roll with their long dimensions in vertical planes parallel with the vertical planes in which the axes of the husking rolls lie, said conveyer being arranged to travel in a direction parallel with the vertical planes passing through the axes of the snapping rolls, and an inclined pan located below the delivery end of the conveyer and leading to the husking rolls and arranged to receive the ears of corn sidewise from the conveyer and deliver them endwise to the husking rolls without turning the same and means for reciprocating the pan longitudinally of the husking rolls.

In testimony whereof I affix my signature in presence of two witnesses.

WILLIAM CLOUSER. [L. S.]

Witnesses:
 GEO. D. SUNKEL,
 M. F. COLLIER.

---

Copies of this patent may be obtained for five cents each, by addressing the "Commissioner of Patents, Washington, D. C."